US008087387B2

(12) United States Patent
Gamble et al.

(10) Patent No.: US 8,087,387 B2
(45) Date of Patent: Jan. 3, 2012

(54) SPECIAL RAWHIDE HOLDING DEVICE FOR PETS

(76) Inventors: Angela Gamble, Hagerstown, IN (US); Julie Fallon, Hagerstown, IN (US)

( * ) Notice: Subject to any disclaimer, the term of this patent is extended or adjusted under 35 U.S.C. 154(b) by 508 days.

(21) Appl. No.: 12/218,312

(22) Filed: Jul. 14, 2008

(65) Prior Publication Data

US 2009/0025649 A1     Jan. 29, 2009

Related U.S. Application Data

(60) Provisional application No. 60/959,457, filed on Jul. 13, 2007.

(51) Int. Cl.
     *A01K 29/00*          (2006.01)
(52) U.S. Cl. ........................ 119/707; 119/709
(58) Field of Classification Search ................. 119/707, 119/702, 711, 709, 710; D30/129, 160
     See application file for complete search history.

(56) References Cited

U.S. PATENT DOCUMENTS

| | | | |
|---|---|---|---|
| 2,194,736 A | | 3/1940 | Bruler |
| D202,330 S | * | 9/1965 | Fisher ........................ D30/160 |
| 4,309,038 A | * | 1/1982 | Spoon ........................... 473/596 |
| 4,919,083 A | * | 4/1990 | Axelrod ....................... 119/710 |
| 5,033,410 A | | 7/1991 | Sigurdson |
| 5,211,132 A | * | 5/1993 | Farina et al. ................. 119/664 |
| 5,339,771 A | | 8/1994 | Axelrod |
| 5,595,142 A | | 1/1997 | Chill |
| D396,253 S | * | 7/1998 | Beecher ...................... D21/406 |
| 5,778,825 A | * | 7/1998 | Krietzmen et al. ........... 119/708 |
| 5,813,366 A | | 9/1998 | Mauldin, Jr. |
| 5,832,877 A | | 11/1998 | Markham |
| 6,032,615 A | * | 3/2000 | Girard ........................... 119/707 |
| 6,076,486 A | | 6/2000 | Oliano |
| 6,112,703 A | * | 9/2000 | Handelsman ................. 119/707 |
| D439,378 S | * | 3/2001 | Loomis ....................... D30/160 |
| 6,217,408 B1 | * | 4/2001 | Willinger ..................... 446/396 |
| D442,343 S | * | 5/2001 | Flynn ........................... D30/160 |
| 6,311,639 B1 | | 11/2001 | Stickney |
| 6,474,268 B1 | * | 11/2002 | Suchowski et al. .......... 119/709 |
| D473,021 S | * | 4/2003 | Gourley ....................... D30/160 |
| 6,990,927 B2 | * | 1/2006 | Axelrod ....................... 119/707 |
| D523,592 S | * | 6/2006 | Wang .......................... D30/160 |
| 7,063,044 B2 | * | 6/2006 | Handelsman et al. ........ 119/709 |
| D529,668 S | * | 10/2006 | Wang .......................... D30/160 |
| 7,146,934 B1 | * | 12/2006 | Staley ........................... 119/709 |
| D535,065 S | * | 1/2007 | Fenwick ...................... D30/160 |
| D542,506 S | * | 5/2007 | Springer ...................... D1/106 |
| 7,325,514 B1 | * | 2/2008 | Tsengas ....................... 119/707 |
| D572,426 S | * | 7/2008 | McCollum et al. ........... D1/106 |
| 7,426,903 B2 | * | 9/2008 | Simon .......................... 119/707 |
| 7,490,579 B2 | * | 2/2009 | Axelrod ....................... 119/707 |
| 7,506,613 B2 | * | 3/2009 | Wolfe et al. .................. 119/709 |
| 7,536,978 B2 | * | 5/2009 | Washington et al. ......... 119/707 |

(Continued)

*Primary Examiner* — Yvonne R. Abbott
(74) *Attorney, Agent, or Firm* — Ritchison Law Offices, PC; John D Ritchison

(57) ABSTRACT

A unique pet device that is used to hold "chewable" objects for pets such as rawhide bones, carrots and other consumables. The device for pets may be used with dogs, cats, ferrets and other animals that have a proclivity to chew. The device is comprised of a unique combination of a base support with special features, a bone or object holding structure with special integral or discrete components and features, and an optional hold down lid or top to assist the containment of the rawhide or chew toy that is being held by the device. The device is made of high quality, durable material that is pet safe and non-toxic to animals and humans.

16 Claims, 7 Drawing Sheets

U.S. PATENT DOCUMENTS

| | | | |
|---|---|---|---|
| 7,555,997 B2 * | 7/2009 | Wolfe et al. | 119/707 |
| 7,647,894 B2 * | 1/2010 | Axelrod et al. | 119/711 |
| 2005/0039696 A1 * | 2/2005 | Springer | 119/709 |
| 2007/0289553 A1 * | 12/2007 | Jager | 119/710 |
| 2008/0141948 A1 * | 6/2008 | Renforth et al. | 119/710 |

* cited by examiner

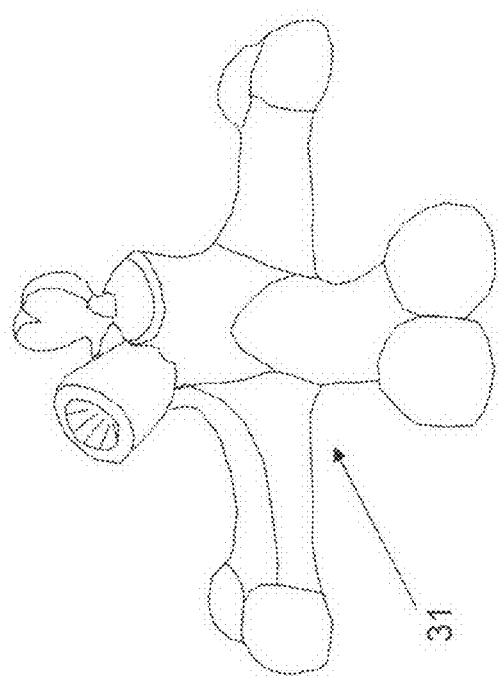
Fig. 1B
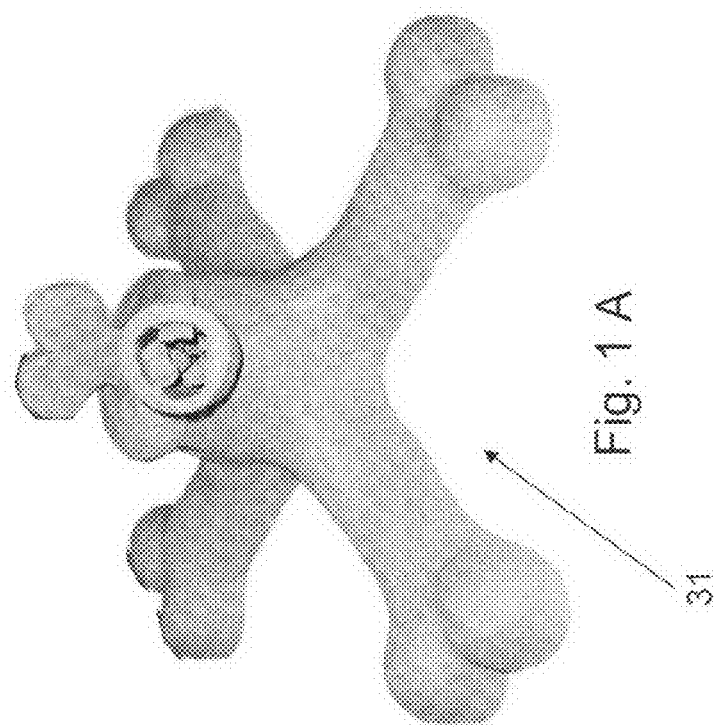
Fig. 1A
Fig. 1

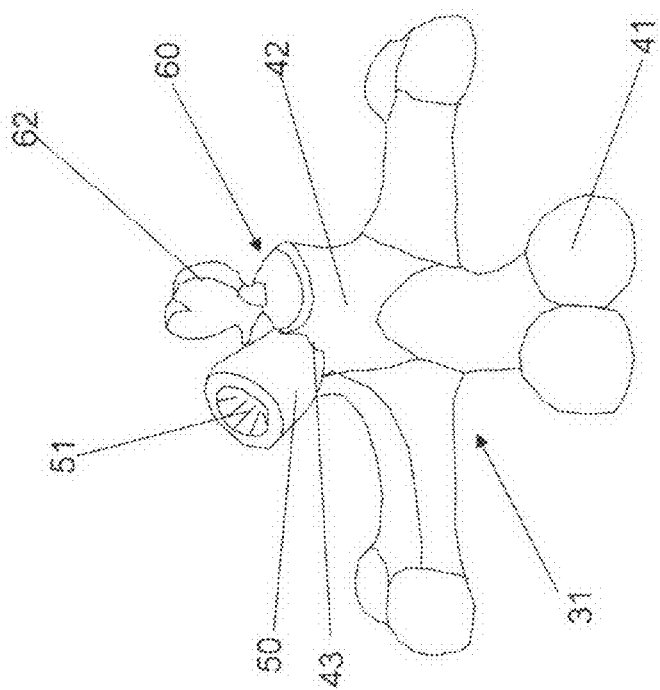
Fig. 2 B
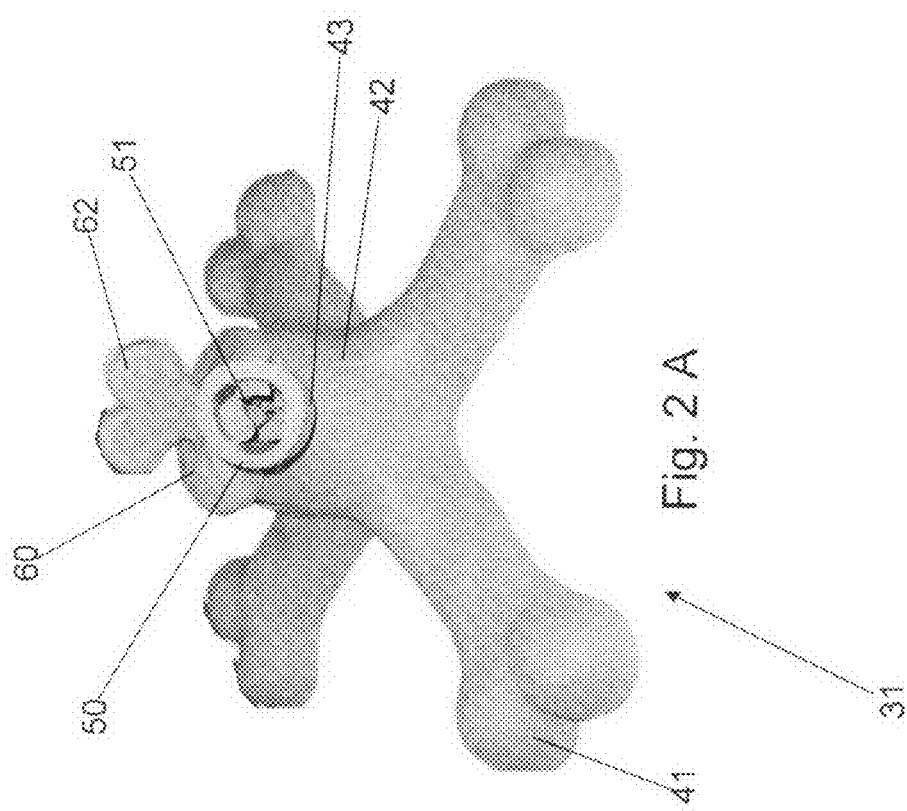
Fig. 2 A
Fig. 2

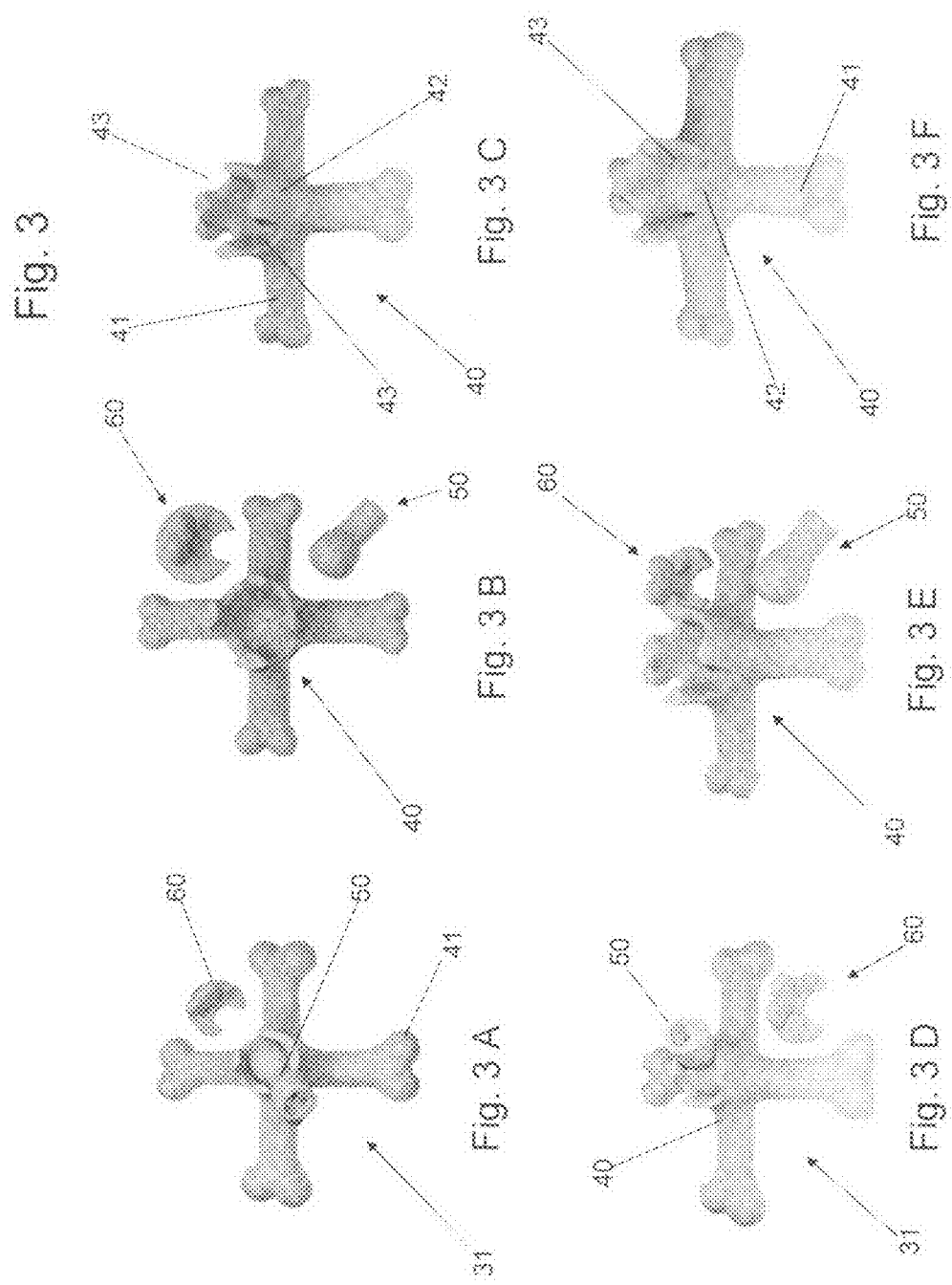

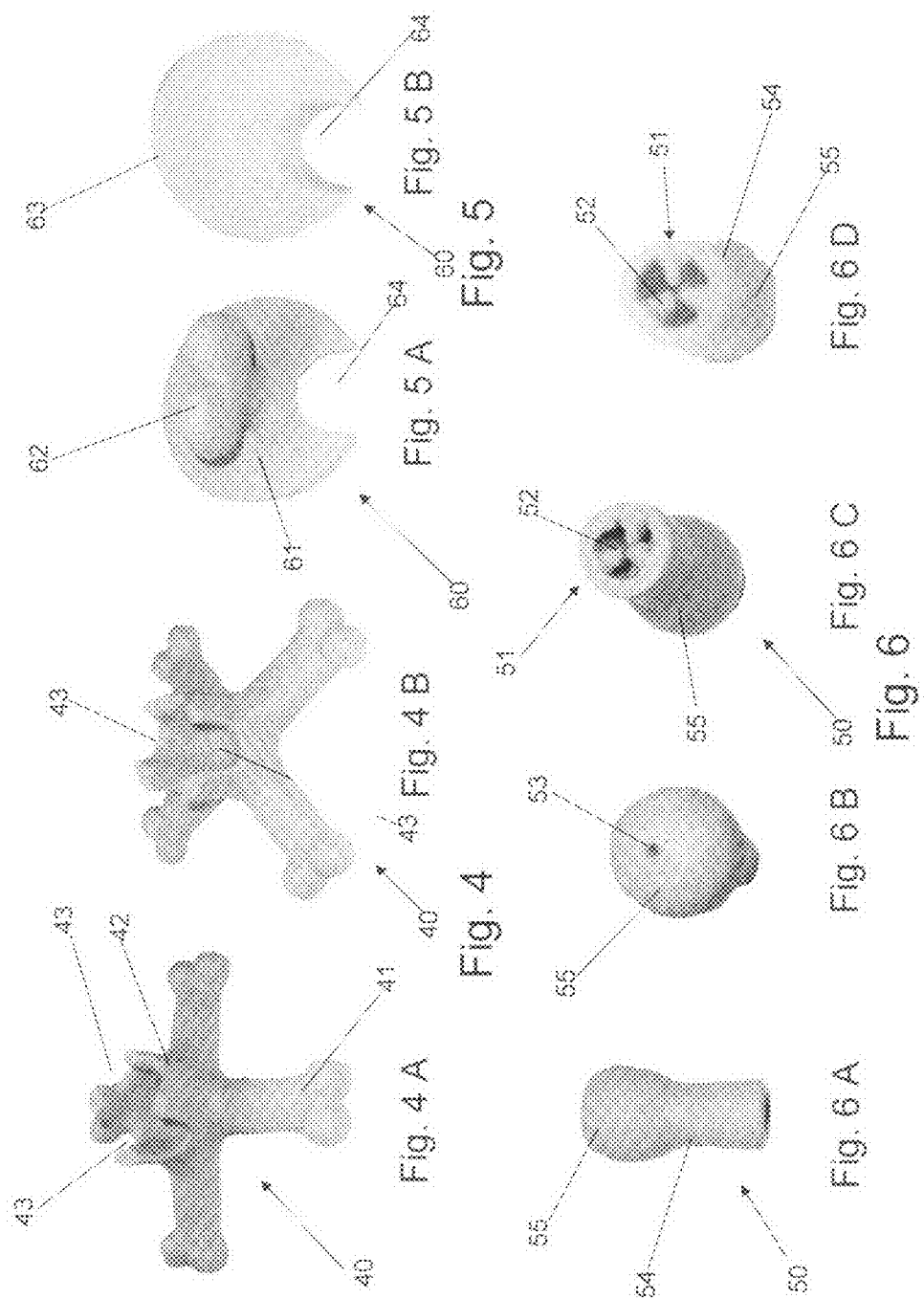

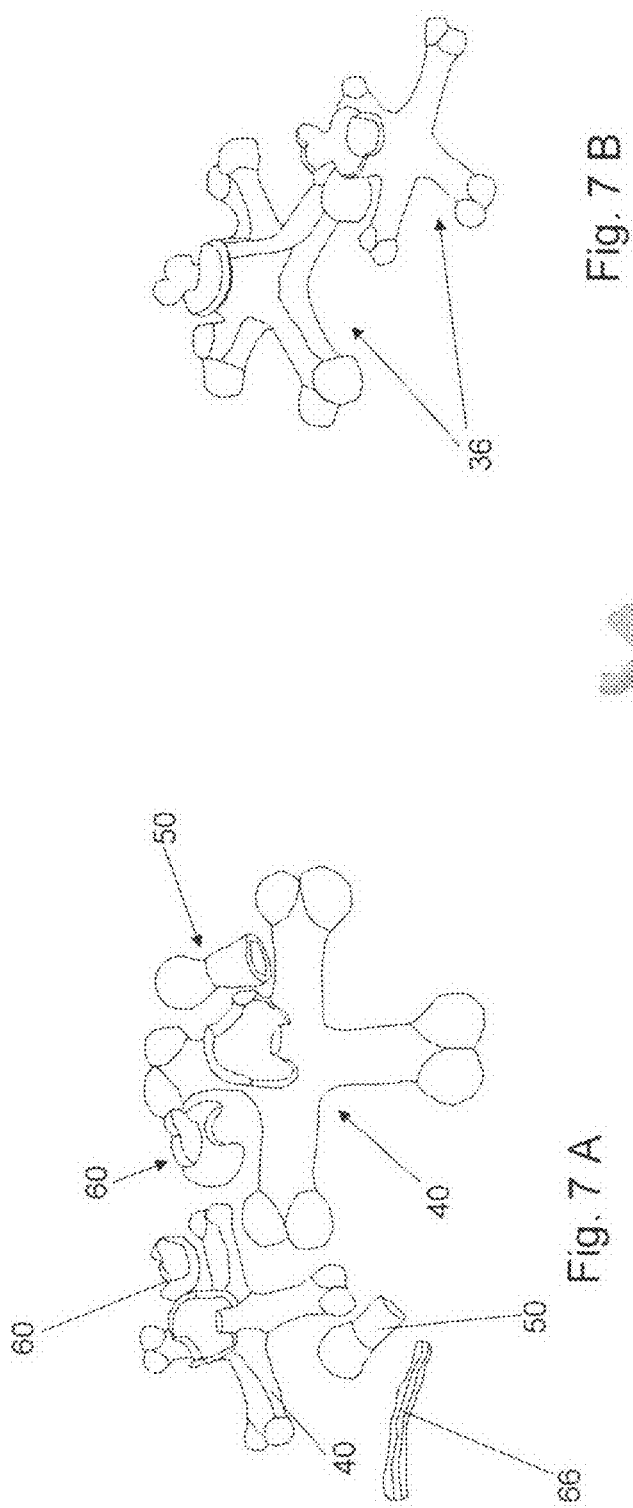
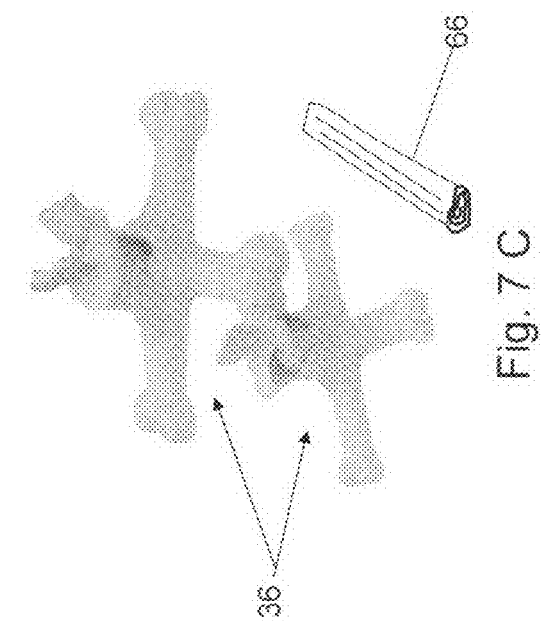
Fig. 7A
Fig. 7B
Fig. 7C
Fig. 7

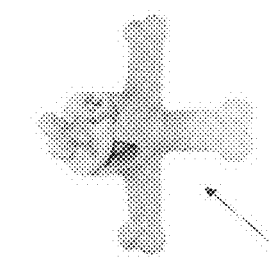
Fig. 8A
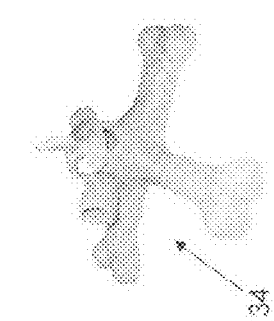
Fig. 8B
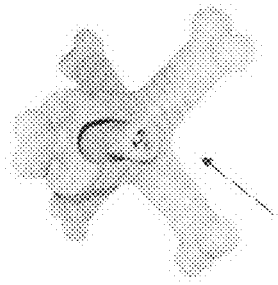
Fig. 8C
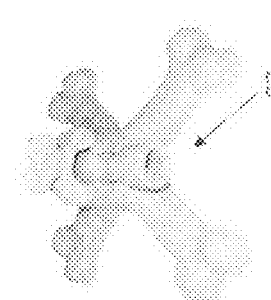
Fig. 8D
Fig. 8
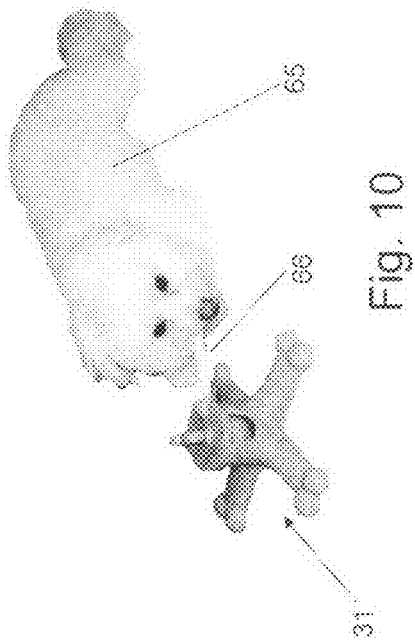
Fig. 9
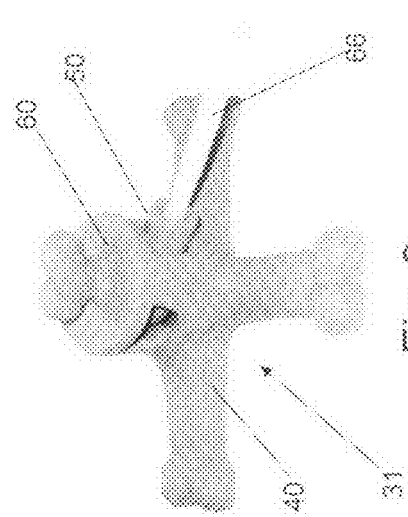
Fig. 10

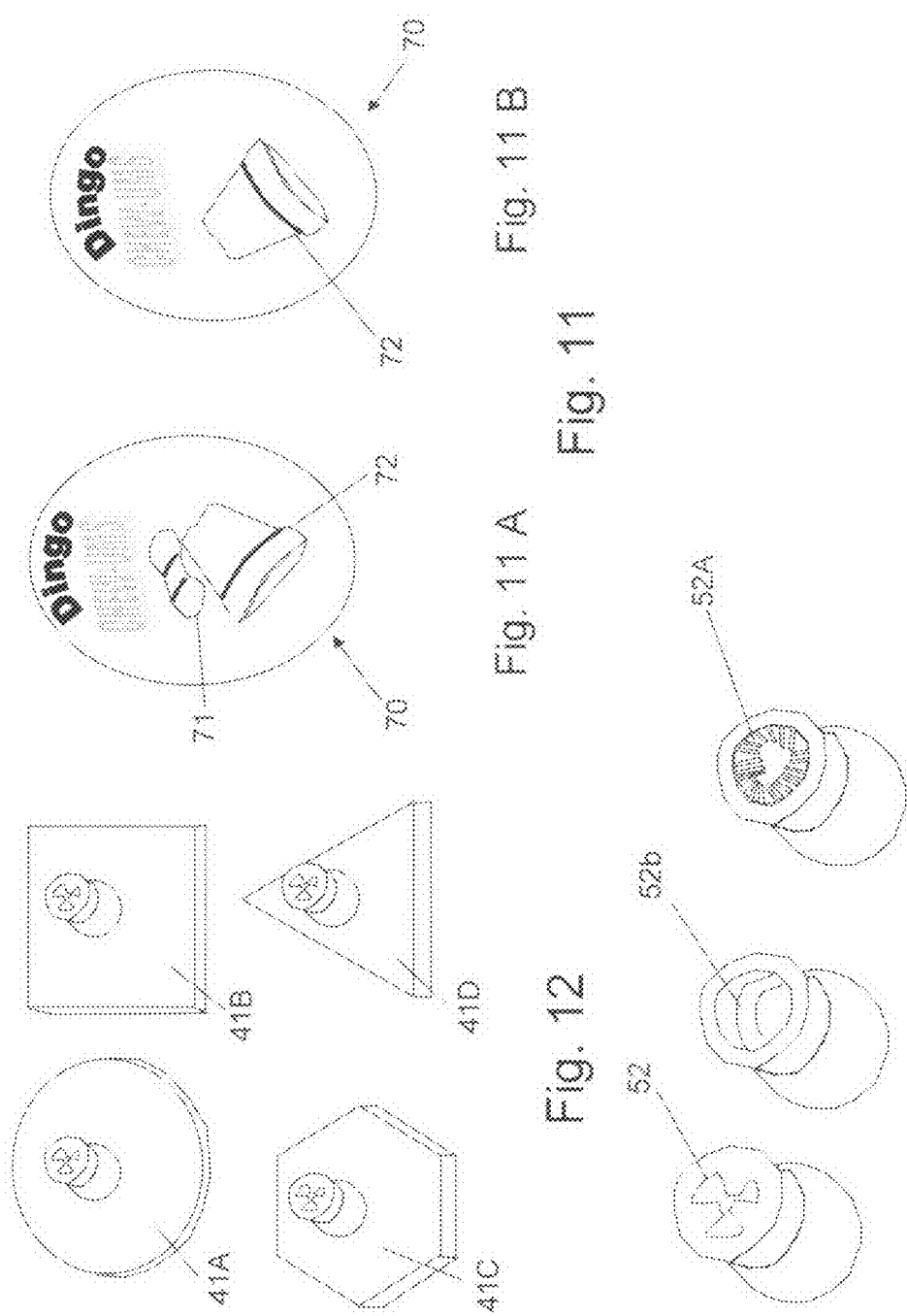

SPECIAL RAWHIDE HOLDING DEVICE FOR PETS

CROSS-REFERENCE TO RELATED APPLICATIONS

This application claims the benefit of Provisional Patent Application Ser. No. 60/959,457 filed Jul. 13, 2007 by Angela K. Gamble and Julie A. Fallon and entitled Special Rawhide Holding Device for Pets.

FIELD OF INVENTION

This invention relates to a Special Rawhide Holding Device for Pets. Particularly this new Special Rawhide Holding Device for Pets is related to devices and methods to hold rawhide bones and other chew toys or treats for pets, especially dogs and cats. This Special Rawhide Holding Device for Pets is a new combination of existing materials configured with unique features that provide an effective, practical and economical way to provide rawhide chew objects to pets. The preferred and alternative embodiments are described below.

FEDERALLY SPONSORED RESEARCH

None.

SEQUENCE LISTING OR PROGRAM

None.

BACKGROUND

Field of Invention and Prior Art

In the Pet Product Industry, statistics show that there are over 73.9 million dogs owned in 69.1 million households in the U.S. according to APPMA. The total U.S. Pet Industry Expenditures according to APPMA are estimated at $40.8 Billion for 2007, which is up from $38.5 Billion in 2006. These industry financial statistics show the pet industry as one of the fastest growing sub sectors in the entire U.S. economy, growing as much as 6% a year according to MSN Money "Investors Make the Most of a Dog's World".

A. Introduction of the Problems Addressed

Traditionally, the use of rawhide pet toys and other chewable and consumable objects are as a stand alone or single item. Occasionally there have been hanging devices and some specifically tooled holder useful for one specific product. As far as known, there is no other Rawhide Holding Device for Pets at the present time which fully provide these improvements and functional characteristics as the present Special Rawhide Holding Device for Pets. It is believed that this device is made with fewer parts with improved configurations and physical features to provide more functionality when compared to other currently utilized rawhide holding devices for use with pets. The particular combinations of materials and features are unique and novel and are not anticipated by prior art. Likewise, use of a Special Rawhide Holding Device for Pets provides significant benefits compared to prior art devices.

B. Prior Art

The historical technology focused mainly on singular use devices with limited focus on use or methods to hold the devices. A few devices have attempted to address holding but focus mainly on specialty objects that are not easily adaptable for universal chewing pieces such as rawhide rolls and the like.

Examples of prior display devices begin with U.S. Pat. No. 2,194,736 issued to Bruler (1940) and entitled "Animal Exercising and Amusement Device". This invention teaches a hanger means for vertical support from a rod or door handle. It shows a spring or corded portion of the device to permit a bone or rod to be suspended. No anticipation of universal bases or use with rawhide is taught. Another chewable pet device is taught by Sigurdson in U.S. Pat. No. 5,033,410 (1991) and entitled "Chewing object for animals having bristle structure". This teaches a device of a bristle material that simulates a bone configuration. No holding structure is anticipated. A device such as anticipated here may be used in conjunction with the new Gamble invention shown herein.

A further example of chew toy that is consumable is shown by Axelrod in U.S. Pat. No. 5,339,771 (1994) and entitled "Animal chew toy containing animal meal". This teaches a bone like configuration made of animal meal and pressed into a "bone shape". No anticipation of a universal holding means is presented, only the chewable device. Another example of prior art in this field is a "Therapeutic animal toy" shown by Chill in U.S. Pat. No. 5,595,142 (1990). The device is hollow and permits a food paste to be held within. It has various external surfaces such as ridges to encourage and stimulate the teeth and gums of an animal. It is specifically taught to not use rawhide pieces and the like. Any food used with the device is not a rigid or stiff object as taught by Gamble herein.

In the U.S. Pat. No. 5,813,366 (1998), Mauldin, Jr. received a patent entitled "Animal toy" with a gripping aperture to place or replace items such as catnip and other pet treats. This taught a toy-like sphere with instability and move ability to attract the pet to the treat and create a "game-like" atmosphere. The alternative embodiment showed a wheel-like, rollable shape utilizing three shafts and a move able object. The Gamble invention stresses the stability of the holder and is not anticipated by the Mauldin Jr. teachings. Still a further example of a pet chew toy is shown by Markham in U.S. Pat. No. 5,832,877 (1998) and entitled "Pet toy product with integral treat receiving receptacles". This teaches another chew toy that may hold treats integral to the consumable, but not a universal, stable base as show by Gamble.

Another U.S. Pat. No. 6,076,486 (2000) was issued to Oliano and is entitled "Animal chew toy and holder". This invention relates to an apparatus which may be used to secure and position animal chew toys. A toy is secured by various means in an elevated position so as to alleviate the need for manipulation by the animal, thus increasing access and use by the animal, and extending the life of the chew toy. The holder has little universality and appears to require specially prepared objects that fit to the base. Thus this is limited as compared to the universal uses by the Gamble invention. An example of a very complex and relatively expensive holder device is shown by Stickney in U.S. Pat. No. 6,311,639 (2001) and entitled "Dog Bone Holder". This teaches a dog bone holder in the preferred embodiment that is cubical in shape with an opening at the top or bottom or both. A series of one or more channels are cut in the top and one or more of the sides. Various shaped openings are shown. Other embodiments show a covering for the open top or bottom which holds the bone in place. On the bottom or side of the bone holder are suction cups, or glue or some other method to hold the bone holder to the floor. The Gamble device is more simple, of less parts and receives more types of objects than anticipated by the Stickney device. A further example of a toy holding device is marketed as a "Chew-Ums" base 72 and marketed by Dingo. The device uses specific objects also marked by Dingo and does not display the universal capabilities show by the Gamble device.

SUMMARY OF THE INVENTION

A Special Rawhide Holding Device for Pets has been developed and designed to provide a unique combination that is specifically related to devices and methods to hold "chewable" objects for pets such as rawhide bones, carrots and the like. The Special Rawhide Holding Device for Pets may be used with dogs, cats, ferrets and other animals that have a proclivity to chew. The benefits are delineated below. The new device presents a "paws-free" rawhide bone holder for that special dog in ones life. The device is made of high quality, durable rubber. It is pet safe and non-toxic to animals and humans. Furthermore it is dishwasher safe.

The preferred embodiment of the Special Rawhide Holding Device for Pets is comprised of a unique combination of a base support with special features, a bone or object holding structure with special integral or discrete components and features, and an optional hold down lid or top to assist the containment of the rawhide or chew toy that is being held by the device.

OBJECTS AND ADVANTAGES

There are several objects and advantages of the Special Rawhide Holding Device for Pets. There are currently no known chew holding devices that are effective at providing the objects of this invention.

The following TABLE A summarizes various advantages and objects of the Special Rawhide Holding Device for Pets. This list is exemplary and not limiting to the many advantages offered by this new device.

TABLE A

| | Various Benefits, Advantages and Objects This device: |
|---|---|
| ITEM | BENEFIT |
| 1. | Holds objects such as rawhide bones tight for easy chewing |
| 2. | Provides a "no-tip" feature with the base configuration |
| 3. | Is safe and made of Pet safe non-toxic materials |
| 4. | Helps eliminate a choking hazard on small chew pieces |
| 5. | Easy to insert and remove objects such as the rawhide bone |
| 6. | Is adaptable to various sizes (Small, Medium, and Large) and low to high holding heights |
| 7. | Is versatile to hold various sized rawhide as well as other chew toys, carrots, treats and the like |
| 8. | Is easy to package |
| 9. | Can be sold and distributed retail, wholesale, or E-commerce internet sales from a website |
| 10. | Is easy to transport |

Noteworthy is that other advantages and additional features of the present Special Rawhide Holding Device for Pets will be more apparent from the accompanying drawings and from the full description of the device. For one skilled in the art of pet toys, chew holders and pet feeders, it is readily understood that the features shown in the examples with this device is readily adapted for improvement to other types of mechanisms and devices for use with pets and other animals.

DESCRIPTION OF THE DRAWINGS

Figures

The accompanying drawings, which are incorporated in and constitute a part of this specification, illustrate a preferred and alternative embodiments for the Special Rawhide Holding Device for Pets. The drawings together with the summary description given above and a detailed description given below serve to explain the principles of the Special Rawhide Holding Device for Pets. It is understood, however, that the device is not limited to only the precise arrangements and instrumentalities shown.

FIGS. 1 A and 1 B are drawings that depict the general preferred embodiment for the Special Rawhide Holding Device for Pets.

FIGS. 2 A and 2 B are drawings that show details and features of the preferred embodiment of the Special Rawhide Holding Device for Pets.

FIGS. 3 A through 3 F are additional drawings that show additional details and features of the preferred embodiment of the Special Rawhide Holding Device for Pets.

FIGS. 4 A and 4 B are drawings that show additional common details for the base of the Special Rawhide Holding Device for Pets.

FIGS. 5 A and 5 B are drawings that show the cap assembly for the Special Rawhide Holding Device for Pets.

FIGS. 6 A through 6 D are drawings that show the object or bone holder of the Special Rawhide Holding Device for Pets.

FIGS. 7 A through 7 C are drawings of various sizes of the Special Rawhide Holding Device for Pets.

FIGS. 8 A through 8 D are examples of the various positions and height adjustments for the holder in the base of the Special Rawhide Holding Device for Pets.

FIG. 9 is an example of use for the Special Rawhide Holding Device for Pets.

FIG. 10 is an example of use for the Special Rawhide Holding Device for Pets showing a pet such as a dog with the chew toy.

FIGS. 11 A through 11 B are examples of the prior art showing a limited "fixed" holder of a special configuration of rawhide.

FIG. 12 are examples of the base configurations for alternative embodiments.

FIG. 13 are examples of the base configurations for alternative embodiments.

DESCRIPTION OF THE DRAWINGS

Reference Numerals

The following list refers to the drawings:

| Ref # | Description |
|---|---|
| 31 | Special Rawhide Holding Device for Pets |
| 32 | Holder in position 1 |
| 33 | Holder in position 2 |
| 34 | Holder in position 3 |
| 35 | Holder in position 4 |
| 36 | Multiple units of differing sizes |
| 40 | Base |
| 41 | Extended support means (bone 41, polygon 41C, circle 41A, triangle 41D or custom design) |
| 42 | Vertical support extension (integral or discrete) |
| 43 | Aperture/slot to receive object/bone retention means (50) |

-continued

| Ref # | Description |
|---|---|
| 50 | Object/bone holder and receiving means |
| 51 | Retention means (bristles, nubs, rings or the like) |
| 52 | Extension for retention (nubbs 52, concentric rings 52A, bristles 52B |
| 53 | Process/mold vent aperture |
| 54 | throat |
| 55 | Rotation means such as a bulb or the like |
| 60 | Cap (optional) |
| 61 | Top of cap |
| 62 | Handle |
| 63 | Seal/securing means such as a thread, light press fit or the like |
| 64 | Aperture clearance for holder (50) |
| 65 | Pet such as a dog or the like |
| 66 | Held Object such as a Rawhide straight wrapped bone or the like |
| 70 | Prior art device |
| 71 | Folded bone |
| 72 | Prior art non-stationary folded bone holder toy |

DETAILED DESCRIPTION OF PREFERRED EMBODIMENT

The present invention presented is a Special Rawhide Holding Device for Pets 31. Particularly the preferred embodiment of the Special Rawhide Holding Device for Pets 31 is related to devices and methods that provide a unique combination which has been specifically configured to hold "chewable" objects for pets such as rawhide bones, carrots and the like. The preferred embodiment of the Special Rawhide Holding Device for Pets is comprised of a unique combination of a base support with special features, a bone or object holding structure with special integral or discrete components and features, and an optional hold down lid or top to assist the containment of the rawhide or chew toy that is being held by the device.

There is shown in FIGS. 1-10 a complete detail and operative embodiment of the Special Rawhide Holding Device for Pets 31. In the drawings and illustrations, one notes well that the FIGS. 1-7 details the special configuration; FIGS. 8, 9, and 10 show the operative use of this invention. FIGS. 11 A and 11 B demonstrate some of the prior art. The operation of the Special Rawhide Holding Device for Pets 31 is discussed below in the Operations section.

The advantages for the Special Rawhide Holding Device for Pets are listed above in the introduction. Succinctly the benefits are the device:
  Holds objects for easy chewing
  Provides a "no-tip" feature
  Is made of Pet safe non-toxic materials
  Helps eliminate a choking hazard for pets
  Is easy to use
  Is adaptable to various sizes
  Is versatile to hold various types and sizes of objects
  Is easy to package
  Can be sold and distributed various ways
  Is easy to transport The preferred embodiment of the Special Rawhide Holding Device for Pets 31 is comprised of a unique combination of a base support with special features, a bone or object holding structure with special integral or discrete components and features, and an optional hold down lid or top to assist the containment of the rawhide or chew toy that is being held by the device.

The accompanying drawings, which are incorporated in and constitute a part of this specification, illustrate a preferred embodiment of the Special Rawhide Holding Device for Pets 31. The drawings together with the summary description given above and a detailed description given below serve to explain the principles of the Special Rawhide Holding Device for Pets 31. It is understood, however, that the Special Rawhide Holding Device for Pets 31 is not limited to only the precise arrangements and instrumentalities shown.

FIGS. 1 A and 1 B are drawings that depict the general preferred embodiment for the Special Rawhide Holding Device for Pets 31. Two views and sizes are depicted for exemplary and not limiting purposes. The preferred material anticipated for the Special Rawhide Holding Device for Pets 31 is a non-toxic, pet-safe rubber that is dishwasher safer. Other possible materials could be composite materials, including, for example a polyurethane or a plastic with a relative soft durometer (acceptable for chewing but resistive to tears by a pet's teeth); cardboard or recycled cellulose materials; cast or formed metals (for example aluminum, cast iron, pewter or the like) with inserts and soft coatings; or the like.

FIGS. 2 A and 2 B are drawings that show more details and features and components of the preferred embodiment of the Special Rawhide Holding Device for Pets 31. Again two sizes are shown for example, not limitation with the components noted. Depicted are components and features of the base 40 such as the extended support means 41 which may be a custom design such as a depiction of a bone—such as shown here. Other functional base support means could resemble a polygon 41C (square 41B, rectangle, triangle 41D or the like), an oval base (circle 41A, ellipse, or the like), or another custom or novel base like the bone as shown. These alternative embodiments for the base are shown in FIG. 12. The vertical support 42 of the base provides an extension to contain the object holder 50. This extension 42 has apertures or slots 43 of various depths that permit the holder 50 to be positioned at various heights. One skilled in toys and holders appreciates there may be one or more slots 43 at a plethora of depths to give numerous variations. These variations are well within the scope and spirit of the Special Rawhide Holding Device for Pets 31. Features of the holder 50 shown here include the retention means 51 as more fully described below. The optional cap 60 is shown with the functional yet artistic handle 62. The various materials and features in FIG. 2 are as described in FIG. 1. One also notes the ability to make the features integral as shown in the drawings or the prototypes, or as discrete parts requiring some sub-assembly. For example, the extension 42 may be integral or separate and fastened to the support means 41 of the base 40. Similarly, the retention means 51 may be integral to the holder 50 or discrete and insert molded or placed into the holder 50 as a secondary operation.

FIGS. 3 A through 3 F are additional drawings that show additional details and features of the preferred embodiment of the Special Rawhide Holding Device for Pets 31. The individual components and features are as described in FIGS. 2 and 1. Here, additional views from other angles demonstrate the full scope of the Special Rawhide Holding Device for Pets 31.

FIGS. 4 A and 4 B are prototype drawings that show other views of the common details for the base 40 of the Special Rawhide Holding Device for Pets 31. Of special note are the clear depictions of the various sized apertures 43 that provide a means to secure the holder 50 at various heights.

FIGS. 5 A and 5 B are drawings that show the cap assembly 60 for the Special Rawhide Holding Device for Pets 31. In these views, the cap 60 has the handle feature 62 and the aperture 64 shown. The aperture 64 permits the object holder 50 to protrude from the base 40 in order to place the object rawhide 66 (not shown) to be inserted. The FIG. 5 B illustrates the bottom of the cap 60 with the aperture 64. The perimeter has a securement means 63 such as a light press interference, a configured lip, or a threaded means that mates to the extension 42 of the base 40.

FIGS. 6 A through 6 D are drawings that show the object or bone holder 50 of the Special Rawhide Holding Device for Pets 31. A side view is shown in FIG. 6 A with the holder 50 showing the throat (reduction) 54 and the rotation means 55 such as a bulb or the like. The throat 54 is contiguous to the aperture 43 of the extension 42 to the base 40. The bulb-like rotation surface 55 is contiguous to the interior of the extension 42 of the base 40. In FIG. 6 B, a process vent and piece removal aperture 53 is shown on the bulb 55. The vent assumes a molded or cast bulb. However, the aperture permits safe removal of the last portion of a piece of rawhide or other chewable objects placed in the device. A machined bulb 55 would not require the vent 53. In FIGS. 6 C and 6 D, the holder 50 shows the retainer means 52 and the throat 54. The nubs or extensions 52 for one type of retainer 51 is portrayed. One skilled in holding objects recognizes the means 51 may be discrete parts inserted or placed in a secondary operation. Equally, the retention feature 51 may be integrally molded or cast to the holder 50. Various retention means 51 are anticipated. For example, a series of extension nubs 52, a series of bristles 52A, concentric rings 52B and other features would be well within the scope and spirit of the Special Rawhide Holding Device for Pets 31. These alternatives are shown in FIG. 13.

FIGS. 7 A through 7 C are drawings of various sizes 36 of the Special Rawhide Holding Device for Pets 31. These various sized devices 36 still are comprised of the base 40, the holder 50 and the optional cap 60. All are used to hold and position the rawhide object 66.

FIGS. 8, 9, and 10 are shown below in the Operations portion of this Specification.

FIGS. 11 A through 11 B are examples of the prior art 70 showing a limited "fixed" holder 72 of a special configuration of rawhide 71. This demonstrates a throw and bounce toy and not a stationary device to hold rawhide and other objects for pets. Obviously, this art does not show the simplicity and versatility as described for the Special Rawhide Holding Device for Pets 31. The limitations of the prior art 70 are self evident in the limitation of what articles and objects 71 may be held only at a given position. Likewise, the base 72 is not as close to the surface forcing many pets 65 to stand in an awkward position to use.

All of the details mentioned here are exemplary and not limiting. Other components specific to describing a Special Rawhide Holding Device for Pets 31 may be added as a person having ordinary skill in the field of toys, devices and chew holders for pets and animals well appreciates.

OPERATION OF THE PREFERRED EMBODIMENT

The preferred embodiment for the Special Rawhide Holding Device for Pets 31 has been described in the above paragraphs. The manner of how the device operates is described below. One skilled in the art of pet toys and rawhide chew holders for pets will note that the description above and the operation described here must be taken together to fully illustrate the concept of the Special Rawhide Holding Device for Pets 31.

The preferred embodiment of the Special Rawhide Holding Device for Pets 31 is comprised of a unique combination of a base support with special features, a bone or object holding structure with special integral or discrete components and features, and an optional hold down lid or top to assist the containment of the rawhide or chew toy that is being held by the device. These features and details of the device 31 are described above.

FIGS. 8, 9 and 10 are examples of how to use the Special Rawhide Holding Device for Pets 31. FIGS. 8 A through 8 D are examples of the various positions 32-35 and height adjustments for the holder 50 in the base 40 of the Special Rawhide Holding Device for Pets 31. FIGS. 8 A and 8 B show the transition from a low position 32 to a little higher 33. Then, the position increase again to a little higher position 34 in FIG. 8 C and finally to the highest position 35 in FIG. 8 D.

FIG. 9 is an example of use for the Special Rawhide Holding Device for Pets 31. This depicts the prototype 31 with the base 40, the holder 50 and the cap 60 engaged in securing the rawhide object 66. As discussed above, several objects are anticipated. For example and not limitation, the object 66 may be a rawhide rolled strip, a vegetable like a carrot or celery, a chew toy, or other treats.

FIG. 10 is an example of use for the Special Rawhide Holding Device for Pets 31 showing a pet 65 such as a dog with the chew toy 66. One skilled in toy and pet devices appreciates many pets 65 such as dogs, cats, ferrets, hamsters, gerbils, and others may benefit from a holding device such as depicted here. Therefore the pet 65 shown is an example and not a limitation to the use of the device 31.

With the above description it is to be understood that the Special Rawhide Holding Device for Pets 31 is not to be limited to only the disclosed embodiment. The features of the Special Rawhide Holding Device for Pets 31 are intended to cover various modifications and equivalent arrangements included within the spirit and scope of the description.

What is claimed as new and desired to be protected by Letters Patent is:

1. A Special Rawhide Holding Device for Pets (31) comprised of
   (a) a stable and tip resisting base (40) with a radiating support means (41) all made of a durable material;
   (b) a means (50) to hold an elongated and chewable pet (65) object (66); and
   (d) a cap (60) to help secure and hold the elongated object (66)

wherein the special device (31) may be used to secure an elongated chew object (66) such as a rawhide stick and present it safely to a pet (65) for use.

2. The device according to claim 1 wherein the durable material is rubber.

3. The device according to claim 1 wherein the durable material is a composite material.

4. The device according to claim 3 wherein the composite material is a plastic.

5. The device according to claim 4 wherein the plastic a polyurethane.

6. The device according to claim 3 wherein the composite material is a cardboard.

7. The device according to claim 3 wherein the composite material is a recycled cellulose.

8. The device according to claim 1 wherein the durable material is metal.

9. The device according to claim 1 wherein the means to hold is a hollow vertical support extension with a set of radiating nubs interior to the vertical support.

10. The device according to claim 1 wherein the means to hold is a hollow vertical support extension with a set of radiating bristles interior to the vertical support.

11. The device according to claim 1 wherein the means to hold is a set of concentric circles of material extended interiorly to a hollow vertical support extension.

12. The device according to claim 1 wherein the base is configured as a solid polygon.

13. The device according to claim 12 wherein the polygon is a triangle.

14. The device according to claim 12 wherein the polygon is a square.

15. The device according to claim 1 wherein the base is configured as a solid circle.

16. A Special Rawhide Holding Device for Pets (31) comprised of
   (a) a stable base and tip resisting (40) made of a durable rubber and configured in a bone-like design with four legs (41) radiating from a centerpoint; and
   (b) a receiving means (50) with an extended retention means (51) to hold a pet rawhide roll-up;
wherein the special device (31) may be used to secure a chew object (66) and present it safely to a pet (65) for use.

\* \* \* \* \*